(12) United States Patent
Cahill

(10) Patent No.: US 6,212,741 B1
(45) Date of Patent: Apr. 10, 2001

(54) PACKAGED ITEM LOCATION, IDENTIFICATION AND CONTROL DEVICE AND METHOD

(76) Inventor: James M. Cahill, 2187 Newcastle Ave., Suite 102, Cardiff-by-the-Sea, CA (US) 92007

( * ) Notice: Subject to any disclaimer, the term of this patent is extended or adjusted under 35 U.S.C. 154(b) by 0 days.

(21) Appl. No.: 09/046,112

(22) Filed: Mar. 20, 1998

Related U.S. Application Data

(63) Continuation-in-part of application No. 08/536,400, filed on Sep. 29, 1995, now abandoned.

(51) Int. Cl.[7] .................................................. A44B 21/00
(52) U.S. Cl. ............................ 24/298; 24/304; 53/472; 206/521; 206/804
(58) Field of Search .................................. 206/584, 521, 206/804, 459.5, 460; 53/472, 474; 40/668, 299.01, 312; 24/298, 300–302, 304, DIG. 11

(56) References Cited

U.S. PATENT DOCUMENTS

| | | | |
|---|---|---|---|
| 2,021,787 | * | 11/1935 | Janowitz ...................... 24/DIG. 11 |
| 2,170,147 | * | 8/1939 | Lane ............................ 24/DIG. 11 |
| 3,306,483 | * | 2/1967 | Bellafiore ...................... 24/304 X |
| 3,677,250 | * | 7/1972 | Thomas ......................... 24/304 X |
| 3,686,717 | * | 8/1972 | Merser .......................... 24/298 |
| 3,926,399 | * | 12/1975 | Tendler ........................ 24/DIG. 11 |
| 4,432,120 | * | 2/1984 | Sherman, Jr. et al. ........... 24/304 X |
| 4,782,967 | | 11/1988 | Thomas ........................ 215/231 |

\* cited by examiner

Primary Examiner—James R. Brittain
(74) Attorney, Agent, or Firm—Henri J. A. Charmasson; John D. Buchaca

(57) ABSTRACT

A tether based connector for locating, identifying, inventorying, controlling and helping to ensure the retrieval of one or more items packaged within a container loaded with potentially obscuring packaging materials. The connector terminates at a fastener at one end for releasably fastening to an item, and at an easily located terminus at the other end. The terminus may be formed as an anchorment for anchoring to the container. A single anchorment may be adapted to serve a plurality of tethers for fastening to a plurality of items. A badge carrying item identifying information can be associated with a connector. A dispenser or applicator dispenses multiple connectors.

An oblong foam slab is separable into anchorment and fastener portions connected by the tether extendible from at least one of the portions.

Also disclosed is an inventive method for packaging items with tethers.

13 Claims, 10 Drawing Sheets

PACKAGED ITEM LOCATION, IDENTIFICATION AND CONTROL DEVICE AND METHOD

PRIOR APPLICATIONS

This application is a continuation-in-part of application Ser. No. 08/536,400 filed Sep. 29, 1995 now abandoned.

FIELD OF THE INVENTION

This invention relates to packaging and more particularly to devices for locating, identifying, inventorying or ensuring the retrieval of one or more packaged items within a container loaded with potentially obscuring packing materials.

BACKGROUND OF THE INVENTION

Items placed into cardboard cartons are often simultaneously placed into packaging materials such as styrofoam peanuts, shredded or balled newspaper and other item obscuring forms of protective materials for protective transport. This method introduces several problems.

First, since items are obscured, there is a possibility of inadvertently discarding items if the person unpacking the container either does not carefully check the container or packing list if such a list even exists.

Another problem is that after items are sealed in a container, it is not possible, without having to reopen the container, to determine the actual contents of the package.

This can lead to disputes between shippers and customers when items are actually missing from the container or when fraudulent claims are made that the items were not originally included.

An additional problem, especially with styrofoam peanuts-style protective materials, is the shifting of the item to the bottom of the package due to the rigors of transport, thereby further obscuring the item and exposing it to a greater risk of shock and vibration hazard.

A device or system which reduces or eliminates some of the above-mentioned problems is therefore desirable.

SUMMARY OF THE INVENTION

The principal and secondary objects of this invention are to provide and inexpensive device or system for locating, identifying, inventorying, controlling and helping to ensure the retrieval of one or more items packaged within a container loaded with potentially obscuring packaging materials.

It is a further object of this invention to provide an efficient tether-based connector dispenser or applicator.

It is a further object of this invention to provide a method for the tethered packaging of items.

These and other valuable objects are achieved by a tether-based connector wherein each tether terminates at a fastener at one end for fastening to the item, and at another end at a more easily locatable terminus which is anchored to the container or floating unobscured by the materials. The fastener may be realized by various attachment mechanisms such as a bag, elastic band, sticky tape, clips or other well-known item fastening means. The terminus may be realized by various mechanisms such as an anchorment of sticky tape, glue, or other more semi-permanent or intrusive means such as a rivet, a staple or other attachment means known in the art, or as a floating tag or hub.

Also disclosed is a single terminus which dispenses a plurality of tethers, each having a fastener. In various embodiments the multi-tethered terminus may be anchored to the inside or outside of the container.

Also disclosed is an efficient tether-based connector dispenser or applicator.

In one embodiment, an identification badge is provided for association with the item connected.

In another embodiment, an oblong foam slab is separable into terminus and fastener portions connected by the tether extendible from at least one of the portions.

Also disclosed is an inventive method for packing an item using a tether-based item locator.

DESCRIPTION OF THE PREFERRED EMBODIMENT OF THE INVENTION

Figure 1:
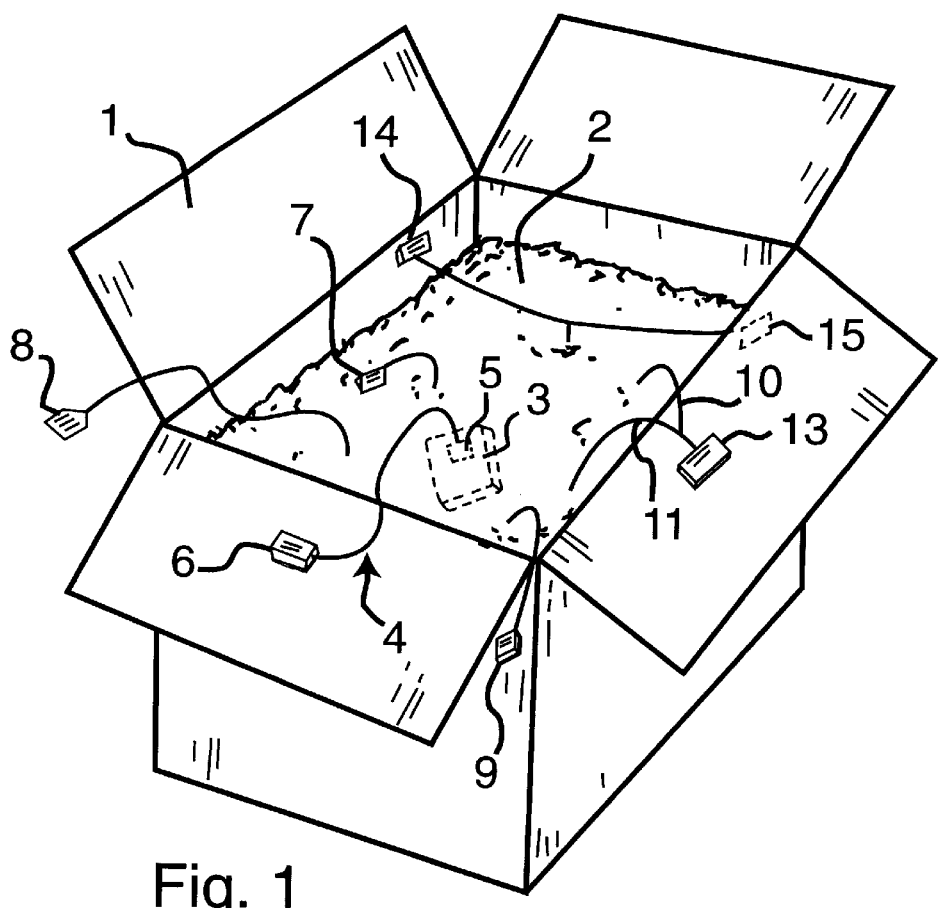
FIG. 1 is a diagrammatic perspective view of a packaging container having a plurality of items loaded within obscuring packaging material and located by a plurality of tether-based connectors.

Referring now to the drawing, there is shown in FIG. 1 a packaging container 1 such as a cardboard box loaded with potentially obscuring protective material 2 such as styrofoam peanuts for protecting an item 3 contained within the container during transport. A tether-based connector 4 connects to the item via a fastener 5 and to an easily locatable terminus 6 for easy retrieval of the item. The terminus can either float unobscured 7 upon the packing materials or dangle 8 outside the container to help identify the item when the container is closed. Alternately, the terminus can be an anchorment for attachment to the inside 6 or the outside 9 of the container. A terminus 13 may connect to multiple tethers 10,11. Further, depending on the length of the tether portion of the connector, the depth at which the item rests within the material can be controlled.

Greater control may be afforded by a plurality of connectors, or a single connector having multiple anchorments 14,15 such that the anchorments are located on either side of the packaged item. The anchorments are preferably affixed corner to corner or side to side so as not to interfere with the opening of, for example, the box top.

Figure 2:
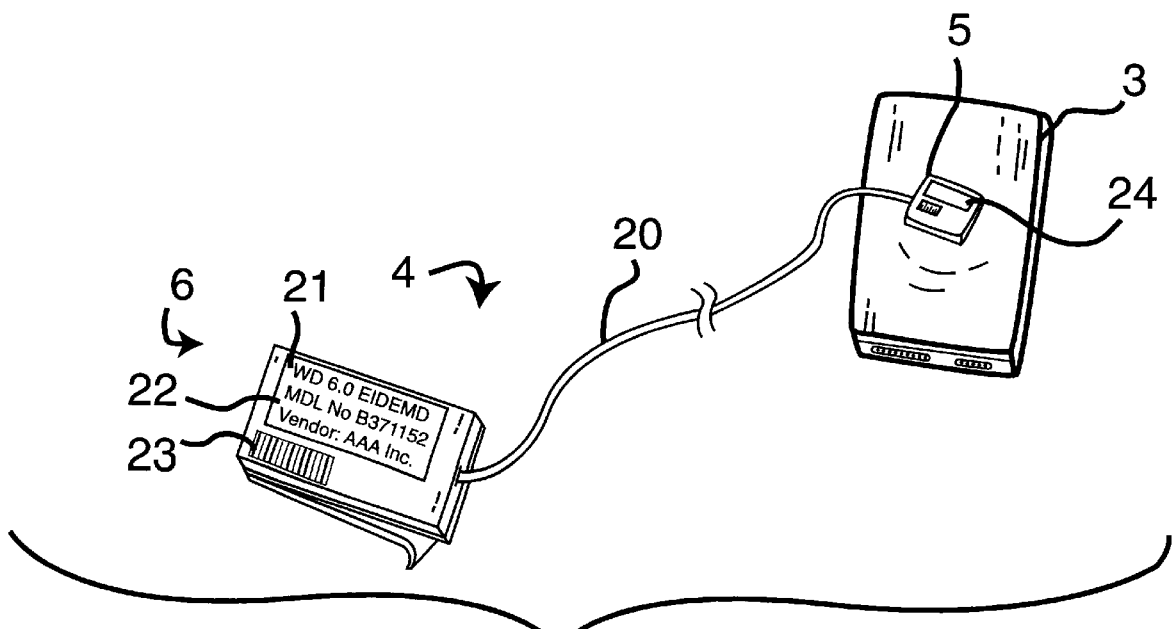
FIG. 2 is a diagrammatic perspective view of a single tether-based connector fastened to an item and having an identification badge.

Referring now to FIG. 2, each tether-based connector 4 comprises a flexible tether 20 having a fastener 5 at one end for attaching the connector to an item 3, and an easily locatable terminus 6 at the other end. The terminus may be formed as an anchorment for attaching to the container.

In this embodiment, the terminus 6 further comprises a badge 21 for providing identifying information associated with the item to which the connector attaches. In this embodiment, the badge is a simple paper tag providing space for written words 22 and a machine scannable bar code 23. A similar badge 24 may be placed on the fastener as well. When the terminus exists outside the container when the container is closed, the badge serves to facilitate inventorying the items therein.

In another embodiment, a programmable microcircuit chip which may be programmed with a bar code or other code may be used on the item, fastener, tether or terminus. One may use a circuit means which connects the programmable chip located inside the package, for example, on the item, to the exterior of the package where the code for the chip may be read out. This will insure an item is actually in the package without having to open the package. The chip may be reprogrammed to indicate the identity of the item or the pricing of the item, for example.

Alternatively, the tether may contain or be an optic fiber which may transmit a signal indicating whether an item is attached and if so the identity of the item. Digital electrical, optical or chemical signals alone or in combination may be used to provide information about the status of packaged items.

Such a system in combination with, for example, a multi-tethered terminus located outside the container provides a convenient and powerful inventory control system which would allow, for example, a warehouse to be easily inventoried.

Figure 3:
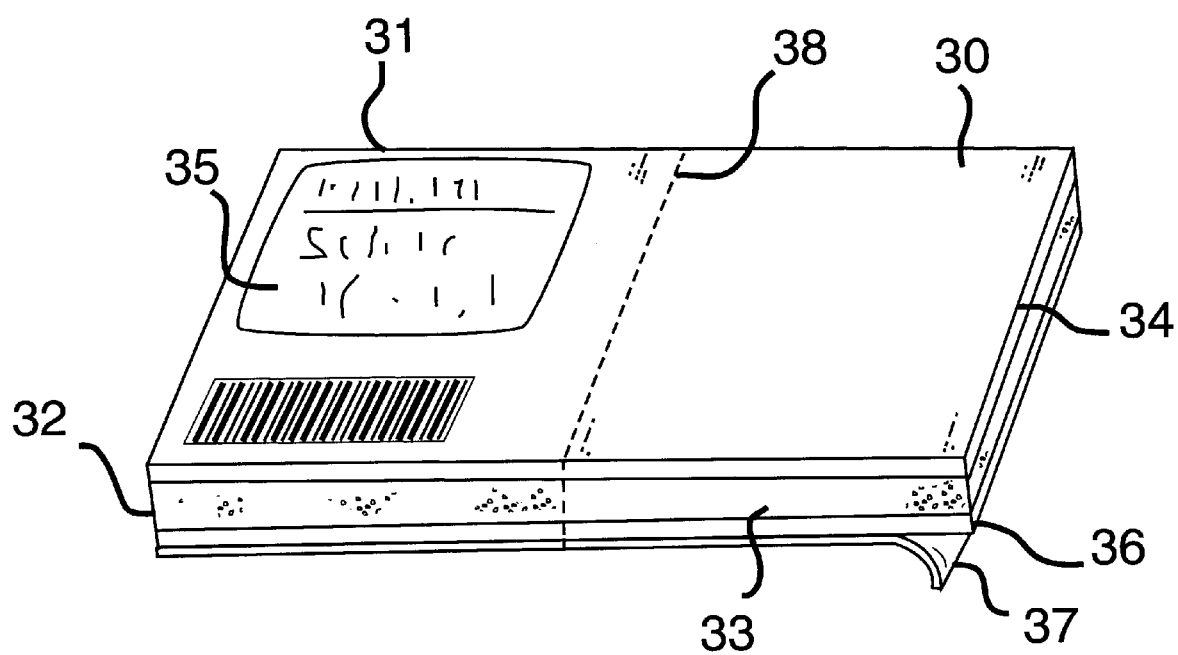
FIG. 3 is a diagrammatic perspective view of the separable foam slab-based tether connector embodiment of the invention.
Figure 4:
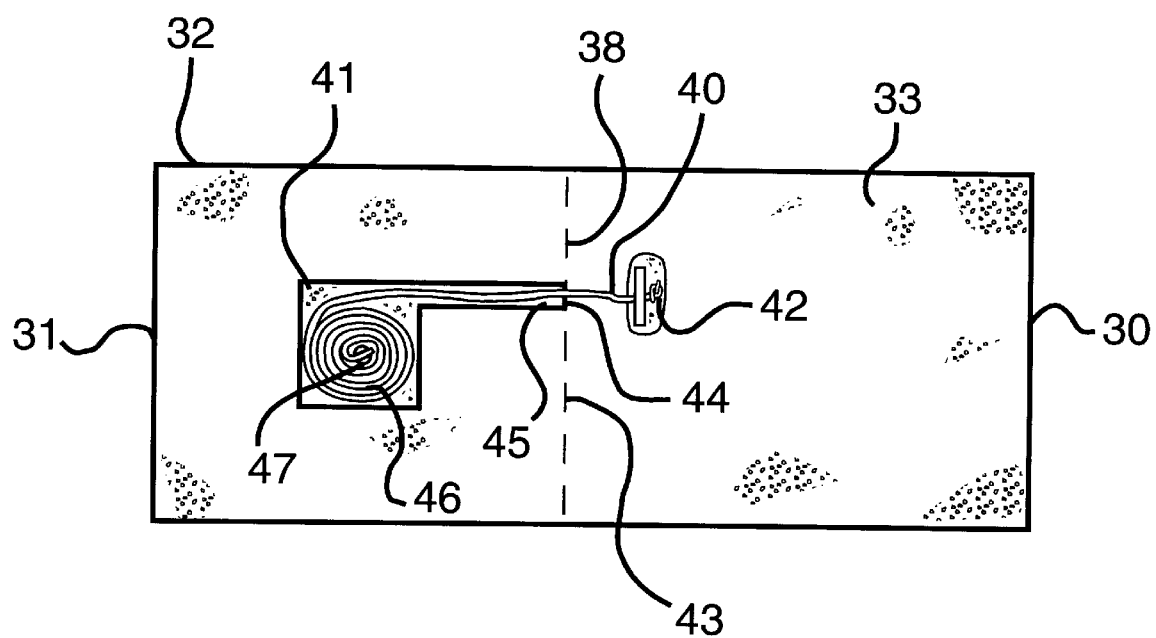
FIG. 4 is a top cut-away view of the tether-based connector showing an extendible tether.

Referring now to FIGS. 3–4, there is shown an embodiment of the invention wherein both the fastener and terminus are realized by a sticky tape based oblong slab 32 separatable into the fastener portion 30 and an anchorment portion 31 of the connector. The slab is formed by a substantially quadrangular open-cell foam body 33 having a top surface covered by a layer of paperboard 34 for carrying the item identifying badge 35, and a tacky lower surface 36 for fastening or anchoring the portions of the slab to the item or container. The tacky surface is covered by a removable wax paper protective cover 37. A transverse perforation 38 across a medial section of the slab is provided to facilitate easy separation of the portions.

As shown in FIG. 4, the tether 40 is extractably loaded within a cavity 41 in the foam body 33 of the slab. One end 42 of the tether is attached to the fastener portion 30. The tether extends from the side wall 43 of the fastener portion bordering the anchorment portion and through a port 44 in the complimentary sidewall of the anchorment portion. A channel 45 leads from the port to the cavity. The tether extends through the channel, into the cavity where it coils 46 about a rotatively mounted central spindle 47. The spindle may be spring biased toward a wound state and lockable through means well known in the art.

Figure 5:
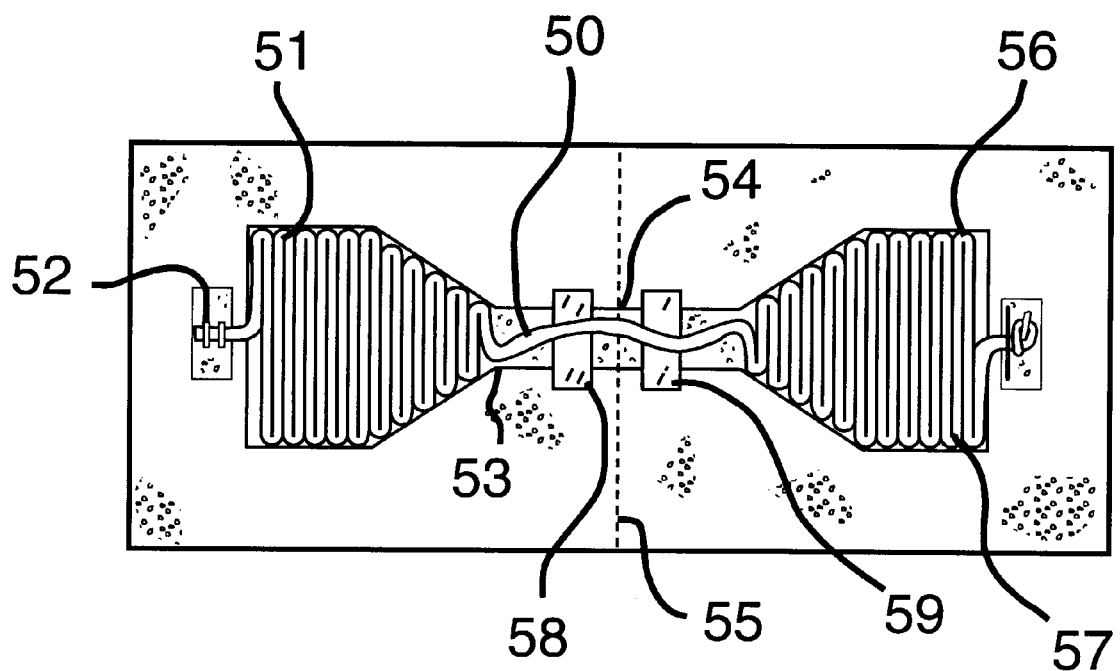
FIG. 5 is a top cut-away view of the tether-based connector showing an alternate embodiment of the extendible tether feature.

Alternately, as shown in FIG. 5, the tether 50 may be extractably loaded into the cavity 51 switchback fashion.

The end 52 of the tether is attached to a wall of the cavity opposite a channel 53 leading to a port 54 in communication with the border 55 of the fastener and anchorment portions. For longer or thicker tethers, a similar cavity 56 for extractably loading an amount 57 of tether may be formed in the fastener portion. Also shown are friction based tether locks 58,59 set within the one or both channels. The may be formed by a pair of sticky tape sections straddling the tether. The locks may be activated by squeezing the sections together about the tether thereby determining the length of tether between the fastener and anchorment portions.

Figure 6:
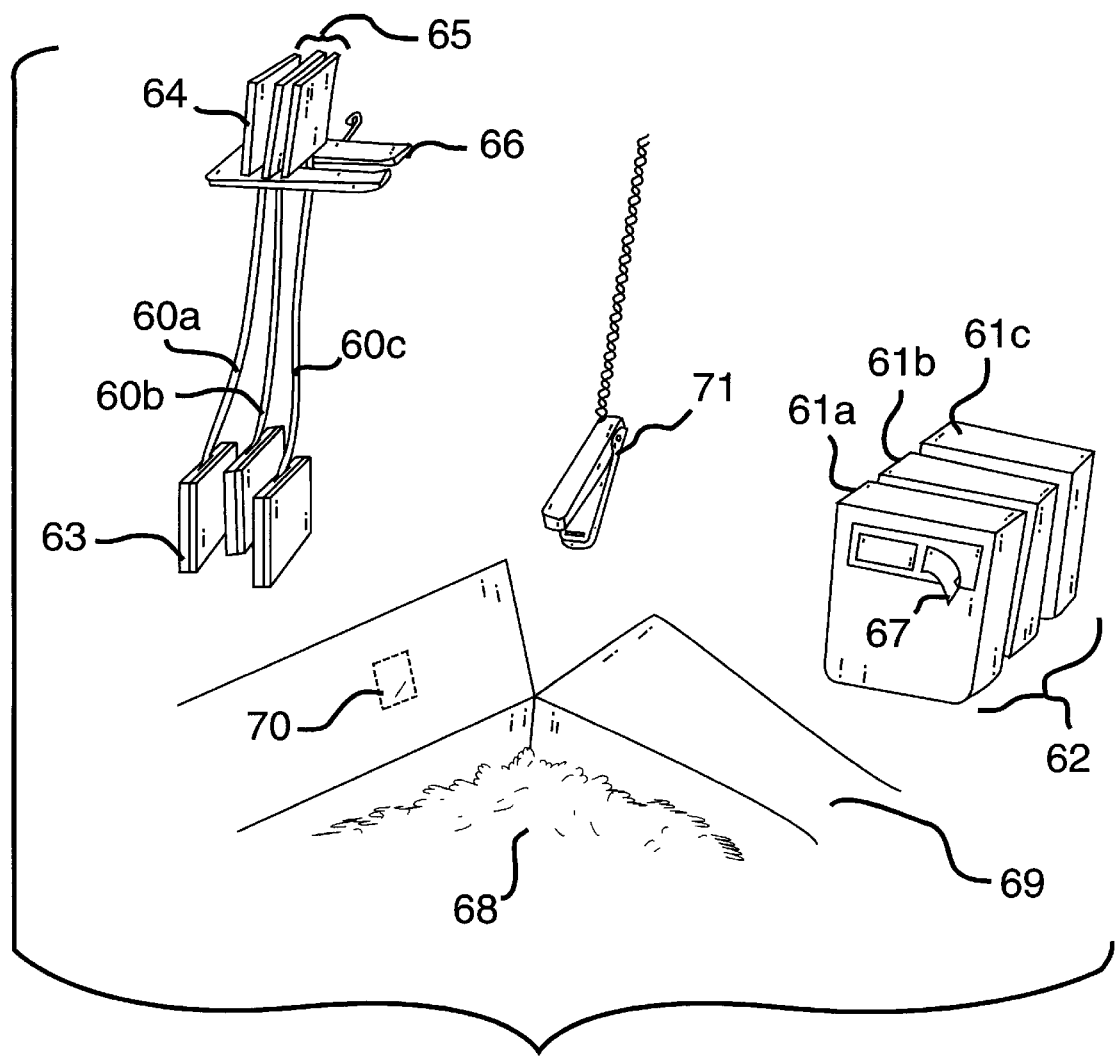
FIG. 6 is a diagrammatic perspective view showing one embodiment of the principal components of a tether based item packaging system for use in an efficient packaging method.

Referring now to FIG. 6, there is shown an efficient method for packaging an item for transport in a container among potentially obscuring protective material. A plurality of connectors 60a, 60b, 60c manufactured to have separate fastener 63 and terminus 64 portions are loaded in a queue 65 for efficient retrieval in a dispenser 66.

Further, items 61a, 61b, 61c to be packaged are arranged in a nearby queue 62 as well. A first item 61a is retrieved from its queue. A sticker-type identifying label 67 is removed from the item, and placed on the terminus portion 64 of a first connector 60a retrieved from its queue. The sticky-tape type fastener portion 63 of the first connector is attached to the first item 61a. The item is then placed into the obscuring protective materials 68 in a container 69. The terminus portion 63 is then laid atop the obscuring material for easy detection upon arrival at the container's destination. Alternately, the terminus may form an anchorment by being attached to the wall 70 of the container using, for example, a stapler 71.

Figure 7:
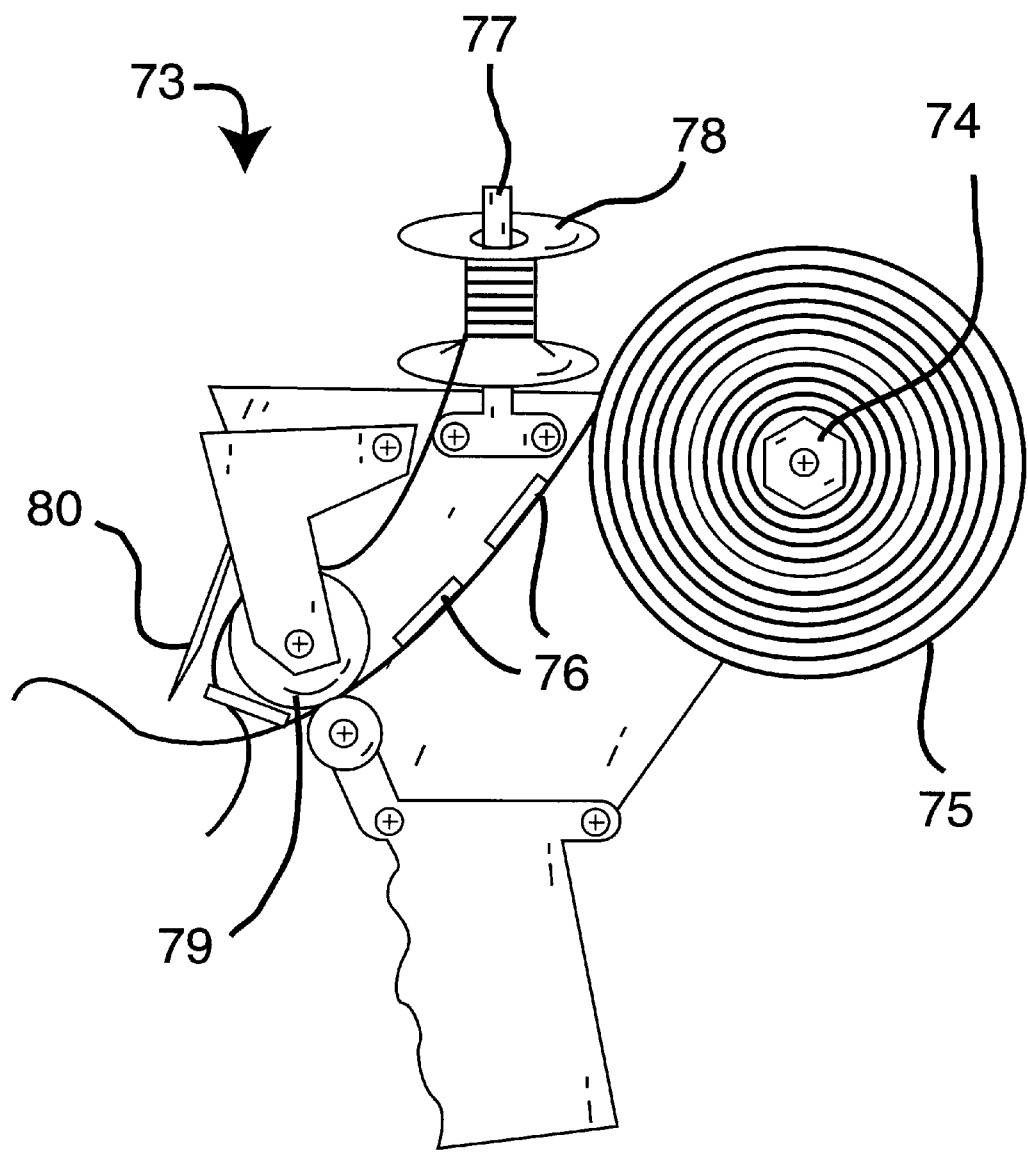
FIG. 7 is a diagrammatic side view of tether based connector applicator.

Referring now to FIG. 7, there is shown a tether-based connector applicator 73. The applicator serves to mechanize the action of attaching the fastener to the item and/or, if necessary, attaching the anchorment to the container. The applicator comprises a first spindle 74 for rotatively carrying a spool 75 of stickers 76 to for the fastener and terminus portions, and a second spindle 77 for rotatively carrying a spool 78 of string type tether material. The spool of stickers is fed through a roller-based peeling station 79 which progressively removes stickers from the sticker spool, places a tacky portion of each sticker into contact with a length of tether material, and orients the sticker for placement on either the item or container. A cutting tool 80 will cut the tether after two stickers have passed through a downward twisting motion of the user.

Figure 8:
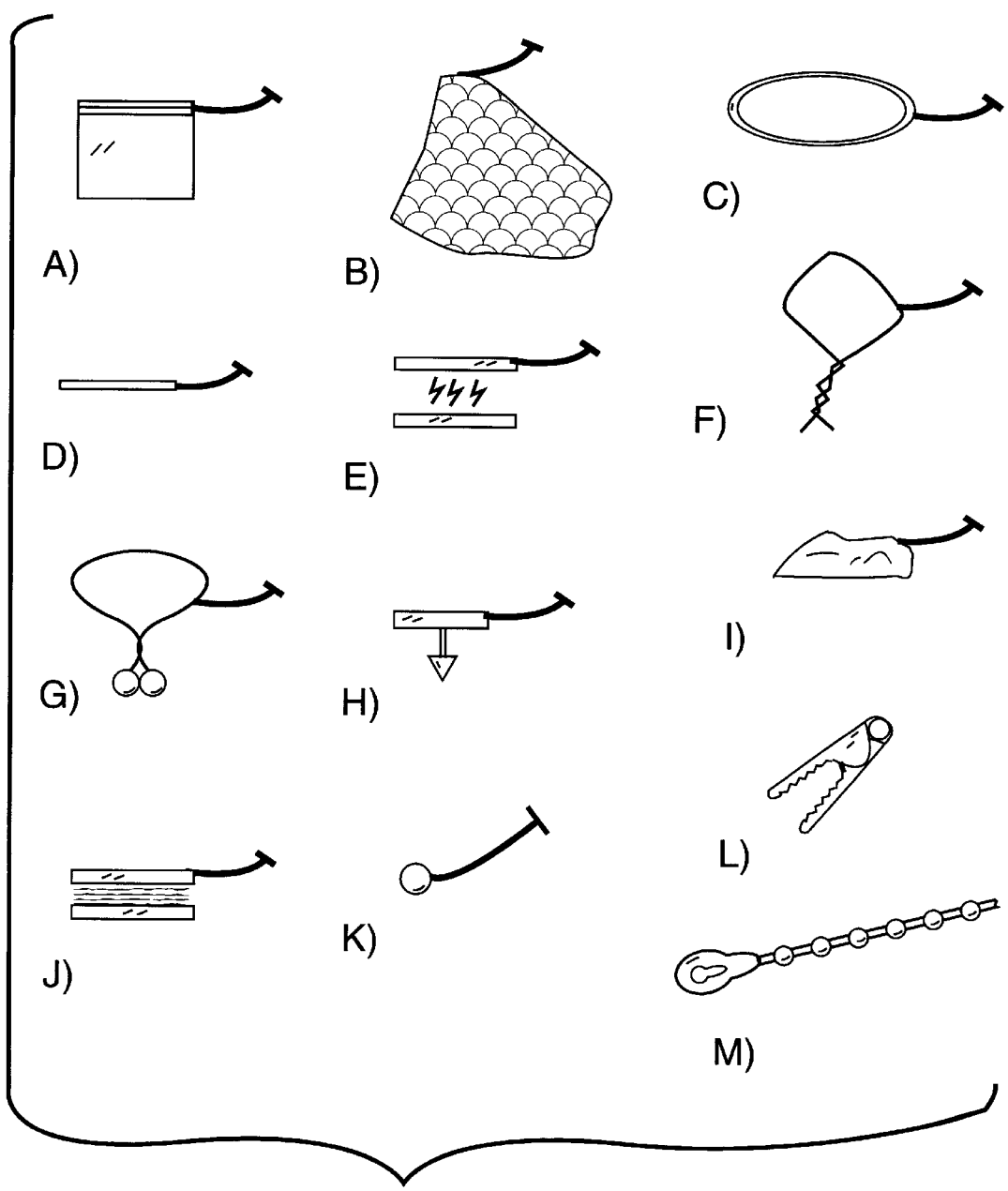
FIG. 8, A–M is a diagrammatic view of various tether fastener embodiments according to the invention.
Figure 9:
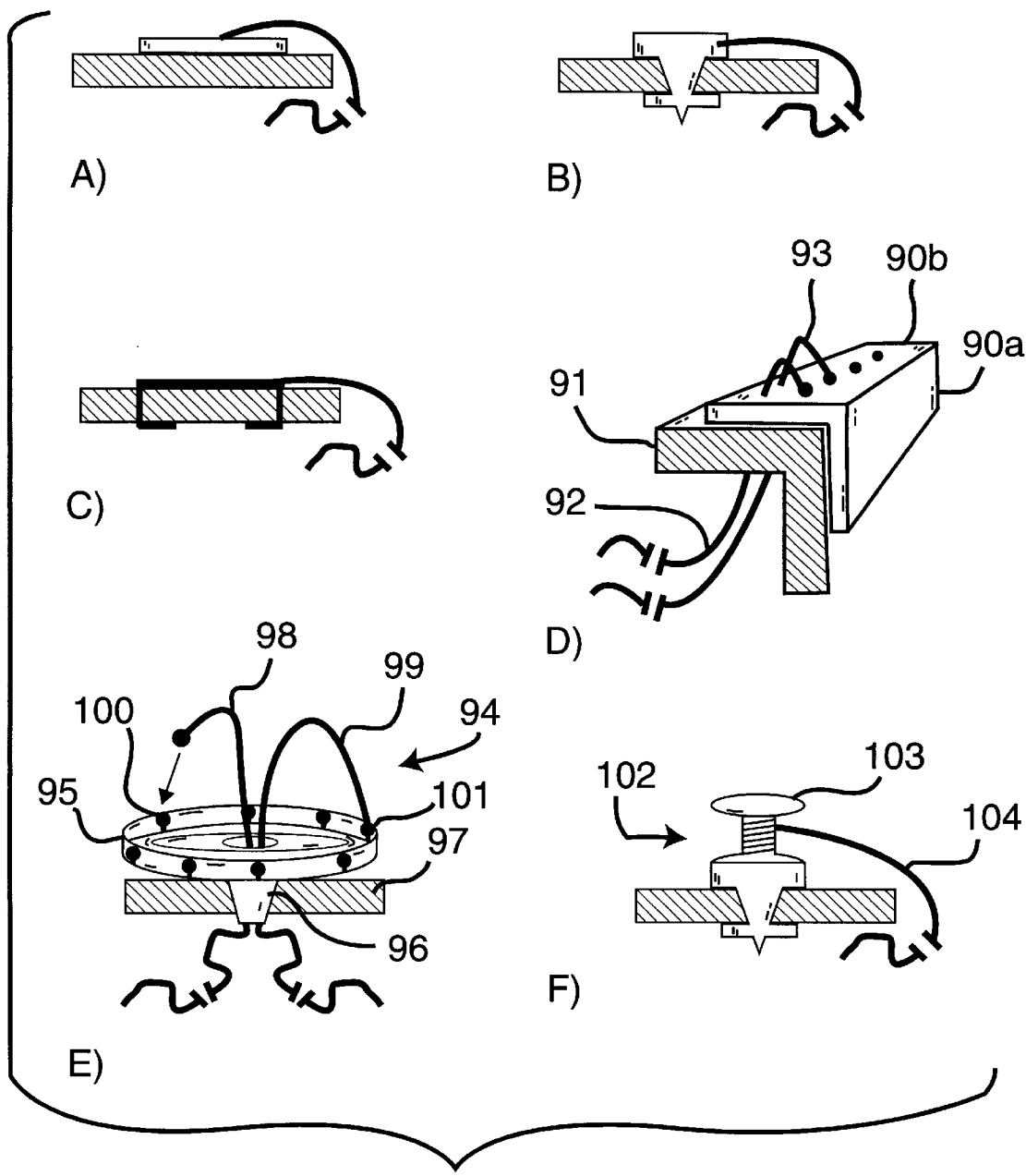
FIG. 9, A–F is a diagrammatic view of various tether-to-container anchorment embodiments according to the invention.

Referring now to FIGS. 8 and 9, various means are available for attaching the fastener or anchorment portions of the connectors. The means used will be dictated by the type of item being connected. These means can include adhesive means such as but not limited to: sticky tapes as in FIG. 8D; glues, tacky wads as in FIG. 8I; and resins; or other physical means such as but not limited to: staples; tacks, nails, rivets and barbs as in FIG. 8H; screws, prongs, snaps, clips, locking rings, looped elastic bands, as in FIG. 8C; complimentary or single magnetic strips, as in FIG. 8E; complimentary hook-and-loop fasteners, as in FIG. 8J; twist-ties, as in FIG. 8F; pull-ties, as in FIG. 8M; purse-lock ties, as in FIG. 8G; string; clips, as in FIG. 8L; sealable bags, as in FIG. 8A; net bags, as in FIG. 8B or various mechanisms designed to attach to various unique features on the item such as insertable end hangers, as in FIG. 8K; or combinations thereof.

Each fastener and terminus may be configured in various forms, for example, but not limited to a plate of various shapes, such as square, rectangular, circular, triangular, multi-sided, such as hexagonal, a bar of square, rectangular, circular, triangular cross-section or; multi-sided, such as hexagonal cross-section, or combinations thereof, or a plate, including any of the configurations described above, formed by the looping of any of the bars as described above. Other shapes or configurations may be used so long as they function to securely attach to the tether, and for those embodiments which are to attach the tether to the container, so long as they may be attached to the container.

In another embodiment, the terminus is an extruded plastic bar with a continuous internal channel which accepts the tether, such that the tether may be free to move along the longitudinal axis of the channel, but is secured within the channel and cannot escape the channel in any direction along any path perpendicular to the longitudinal axis of the channel. One or both ends of the tether may be capped after addition of the tether to prevent escape of the tether along the longitudinal axis or the channel may be formed such that the tether may be rotated in a fashion to lock into the channel.

Both the fastener and terminus may be formed from metal, plastic, wood, rubber, fiberglass, composite materials as would be known to those of skill in the art, and any other material that could serve as an easily detectable terminus for floating atop the protective material or to fasten or anchor the tether without undue risk of breakage.

Referring now to FIG. 9, various embodiments of the easily locatable terminus in the form of an anchorment are shown attached to a container. In FIGS. 9A–9C, sticky tape, rivet, and stable means for anchoring are shown respectively. In FIG. 9D the anchorment is shown as a multi-tethered anchorment having a pair of orthogonal panels 90a,90b for mounting on the outer corner 91 of the container. The anchorment has an aperture for allowing each tether 92,93 to connect with an item carried inside the container.

Similarly, FIG. 9E shows a multi-tethered anchorment 94 formed by a generally circular hub 95 having a central funnel 96 for penetrating through a wall 97 of the container to anchor the anchorment and to allow for passage of the tethers 98,99 through to the inside of the container. The tethers preferably attach to the hub at locking ports 100,101. This funnel may act to secure the tether with respect to the container. This securement may be by mechanical means such as snapping engagement of the tether to the funnel sides, or mere pressure of the tether against each other and the walls of the funnel.

FIG. 9F shows an anchorment 102 having a spindle 103 to allow for spooling the tether 104 and thereby adjusting the tether length to provide control of the location of the item within the protective material.

Figure 10:
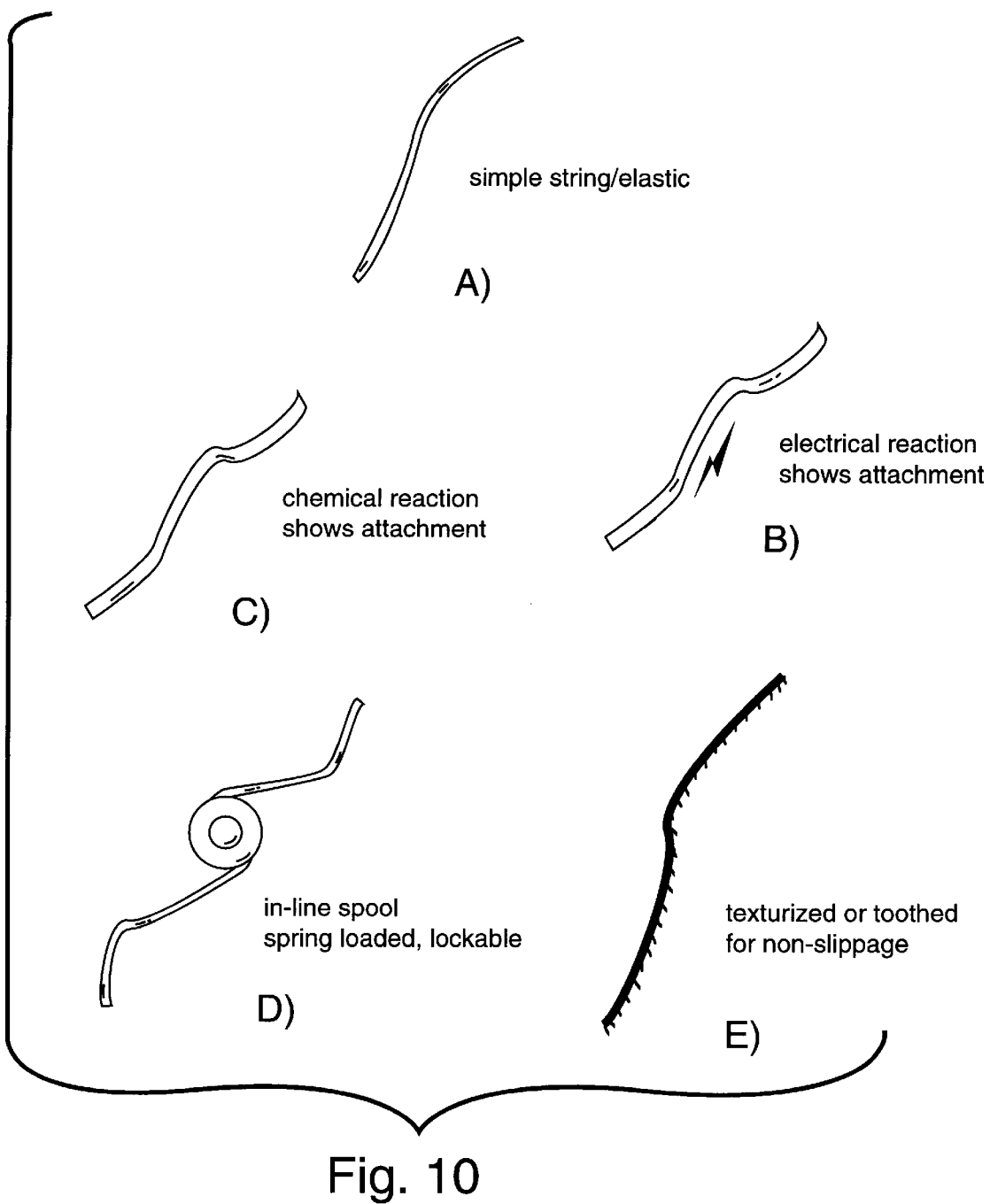
FIG. 10, A–E is a diagrammatic view of various tether embodiments according to the invention.

Referring now to FIG. 10, each tether may be formed from, but not limited to, flexible plastics, rubber, leather; woven materials such as rope, string or thread, as in FIG. 10A; metal chains or cables and other elastic or flexible materials, alternatively rigid materials, such as, but not limited to metal rods, hard plastic or wood may be used. They may be shaped as elongated: bands, cylinders, or other cross-sectional shapes, such as triangles, squares, rectangles, pentagons, hexagons and so forth. Alternatively, any shape which allows for attachment to the fastener or terminus may be used. The length of the tether may be toothed or otherwise textured to provided added friction as in FIG. 10E.

Alternatively, the tether could act to completely encase an item, so long as a means for attachment is affixed to the encasing tether which allows for attachment to the terminus or fastener.

The tether may be of fixed or varying length, being made from elastic material or having an in-line spool, as in FIG. 10D, which may also be spring loaded and/or lockable. Multi-tethered connectors may have various length tethers. For example, some tethers of 6", some of 12", some of 18". Tethers of the same size or combinations of different sizes may be attached to a single fastener or terminus.

In one embodiment a single tether may be fixed at one end to a fastener or terminus and at the other end form an intersection of two or more tethers.

The tether may be formed of a material which can carry information signifying attachment of the connector to an item through chemical means as in FIG. 10B, or electrical or optical means as in FIG. 10C.

Alternatively, the tether alone or in combination with a mechanism on the fastener or terminus, as described below, may be of variable length, such that a single tethering means may be adjusted to be, for example, 6", 12" or 18" or may be infinitely adjustable to variable length within a minimum and maximum range.

Although in the first embodiment the tether is permanently affixed to or integrally formed as part of both the fastener and terminus means, this affixation may be releasable through means of an attachment. The attachment can be located at one end or both ends of or at some intermediate position, including the center or some combination thereof. The attachment may comprise a spherical or cylindrical shape for insertion into a cavity on either fastener or terminus which securely holds the tether. The attachment may comprise a ring which may be opened and securely closed around a ring located on either the fastener or terminus. Other means of securely attaching the tether may be utilized such as through adhesive or mechanical means.

The tethering means may be composed of different colors or contain a readable bar code or other information conveying means either or any combination of which may act to identify the item contained within a package.

In another embodiment, a mechanism comprising a spring loaded inner cylinder or other shaped housing housed within a larger cylindrical or other shaped housing, with a hole through the center of the inner and outer housings through which a tether may be placed and held in firm engagement by the spring action acting on the inner cylinder. This embodiment is envisioned as being similar to the fasteners which secure the draw strings on, for example, a sleeping bag stuff bag. In another variant of this embodiment, the tether may actually be contained on a spool within the spring loaded mechanism.

Figure 11:
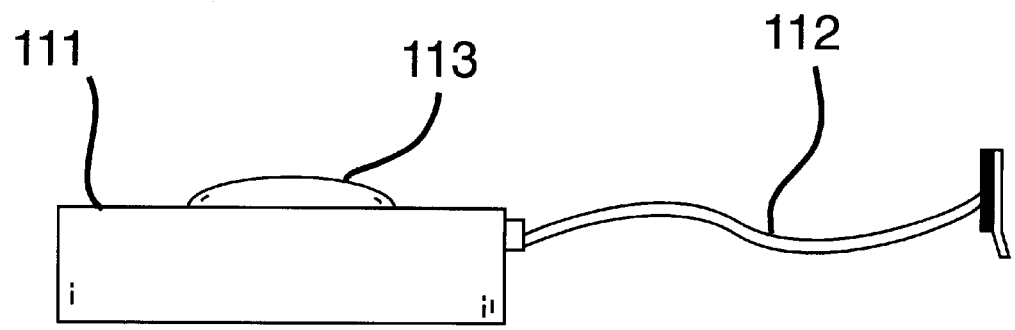
FIG. 11 is a diagrammatic side view of an anchorment providing for an lockable extendible and retractable tether.
Figure 12:
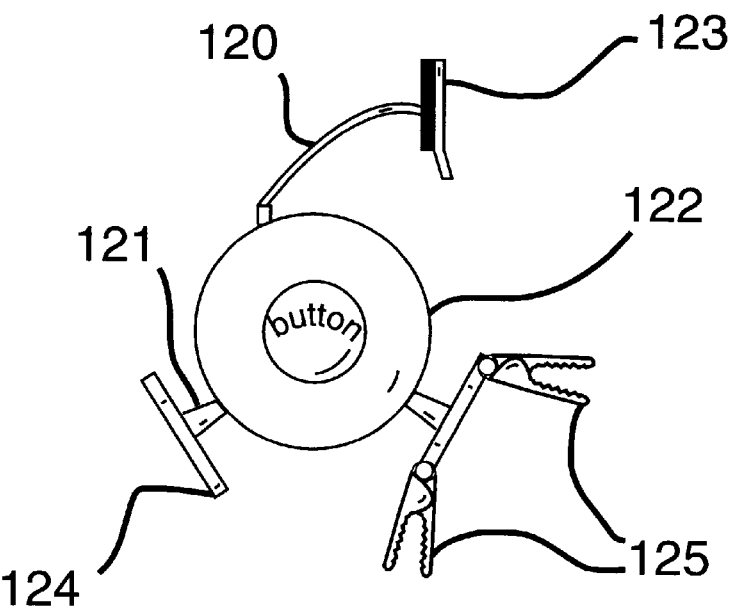
FIG. 12 is a diagrammatic top view of a multi-tethered anchorment providing for lockable extendible and retractable tethers wherein one tether has multiple fasteners.

Referring now to FIGS. 11 and 12, a terminus 111 is provided which allows for adjusting the length of the tether 112. In this embodiment the terminus comprises a mechanism similar to a fishing spinning reel. That is a ratchet mechanism holds the tether at a certain length until, for example, one releases the ratchet by depressing a button 113, allowing the tether means to move freely until the button is released and the ratchet is reengaged. As shown in FIG. 12, the tether length adjusting lockable spring-loaded terminus may be adapted to serve multiple tethers 120,121,122 each having their own fasteners 123,124, or dual fasteners 125.

While the preferred embodiments of the invention have been described, modifications can be made and other embodiments may be devised without departing from the spirit of the invention and the scope of the appended claims.

What is claimed is:

1. A device for locating an item packaged in a container among potentially obscuring protective material comprises:

an elongated flexible tether having a first end connected to a first easily locatable terminus and a second end connected to a first fastener attachable to said item;

an oblong slab separable along a border into first and second portions, said first portion forming said terminus and said second portion forming said fastener; and wherein said tether connects said first and second portions.

2. The device of claim 1, wherein said tether is extractably loaded within a cavity recessed into said first portion through a port connecting said cavity to an outer surface of said first portion.

3. The device of claim 2, wherein said outer surface occurs along a border between said first and second portions while said portions are connected.

4. The device of claims 2, wherein said tether is coiled about a spindle rotatively mounted within said cavity.

5. The device of claim 2, which further comprises a tether extraction lock associated with said port.

6. A method for packaging an item for transport in a container among potentially obscuring protective material comprises:

retrieving a first tether-based connector from a queue of tether-based connectors;

releasably fastening a first end of said first connector to said item;

anchoring a second end of said first connector to said container;

placing said item within said container; and covering said item with an amount of said protective material.

7. The method of claim 6, wherein said second end of said first connector comprises a badge adapted to carry information identifying said item.

8. The method of claim 7, which further comprises attaching said badge proximate to said second end of said first connector.

9. A device for locating an item packaged in a container among potentially obscuring protective material comprises:

an elongated flexible tether having a first end connected to a first easily locatable terminus and a second end connected to a first fastener attachable to said item;

a body separable into first and second portions, said first portion forming said terminus and said second portion forming said fastener; and wherein said tether connects said first and second portions.

10. The device of claim 9, wherein said tether is extractably loaded within a cavity recessed into said first portion through a port connecting said cavity to an outer surface of said first portion.

11. The device of claim 10, wherein said outer surface occurs along a border between said first and second portions while said portions are connected.

12. The device of claim 10, wherein said tether is coiled about a spindle rotatively mounted within said cavity.

13. The device of claim 10, which further comprises a tether extraction lock associated with said port.

* * * * *